United States Patent [19]
Onda

[11] Patent Number: 6,072,954
[45] Date of Patent: Jun. 6, 2000

[54] INTERLOCKING MECHANISM FOR CAMERA

[75] Inventor: Kazuhiko Onda, Saitama, Japan

[73] Assignee: Fuji Photo Optical Co., Ltd., Saitama, Japan

[21] Appl. No.: 08/993,653

[22] Filed: Dec. 18, 1997

[30] Foreign Application Priority Data

Dec. 20, 1996 [JP] Japan ................................ 8-342029

[51] Int. Cl.$^7$ .......................... G03B 15/02; G03B 15/06; G03B 13/10
[52] U.S. Cl. ............... 396/61; 396/62; 396/175; 396/349; 396/379
[58] Field of Search ................. 396/61, 62, 175, 396/349, 379, 383

[56] References Cited

U.S. PATENT DOCUMENTS 4,944,030   7/1990   Haraguchi et al. .................... 354/403
5,083,146   1/1992   Ueda .................................... 396/62
5,570,149  10/1996   Wakabayashi et al. ............... 396/85
5,727,235   3/1998   Ishikawa et al. .................... 396/62
5,790,908   8/1998   Matsuda .............................. 396/379

FOREIGN PATENT DOCUMENTS 478974  12/1992  Japan .

*Primary Examiner*—Eddie C. Lee
*Attorney, Agent, or Firm*—Leydig, Voit & Mayer, Ltd.

[57] ABSTRACT

A camera interlocking mechanism adjusts a visual field angle of a finder and/or an irradiation angle of a strobe in synchronization with a lens barrel being further extended from a photographable position upon telephoto photographing. A driving gear and a driven gear are provided with a thin tooth to temporarily keep a driving force of the driving gear from being transmitted to the driven gear, thus allowing the driving gear to idle. Consequently, a finder lens and a strobe flash bulb do not move more than necessary, whereby the space for installing the finder and strobe can be minimized, thus allowing the camera to have a smaller size.

12 Claims, 10 Drawing Sheets

Fig. 3

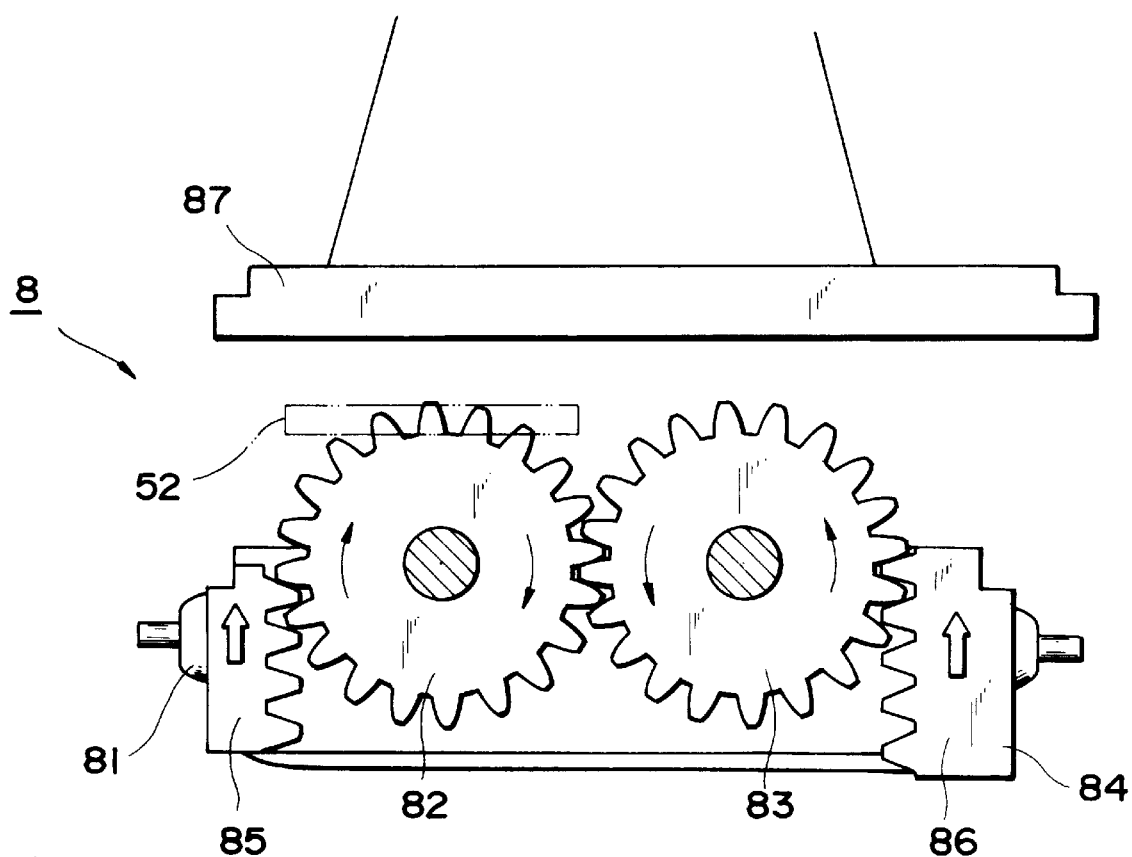

INTERLOCKING MECHANISM FOR CAMERA

BACKGROUND OF THE INVENTION

1. Field of the Invention

The present invention relates to an interlocking mechanism for a camera and, in particular, to a camera interlocking mechanism for interlocking an extending or collapsing operation of a lens barrel with adjustment of visual field angle of a finder or adjustment of irradiation angle of a strobe.

2. Related Background Art

Recently under development are small-sized cameras which have excellent portability. Among these is a camera in which a lens barrel for forming an image of an object onto a film is adapted to be accommodated within the main body of the camera. Namely, there has been known a camera in which the lens barrel is completely accommodated within the main body when the camera is not in use but can be extended as a button or the like is manipulated when the camera is in use, and can further be extended to a large extent upon telephoto photographing. In such a camera, it is necessary to appropriately adjust the visual field angle of its finder and the irradiation angle of its strobe as the lens barrel is extended and collapsed (retracted after being extended). To this end, incorporated within the camera is an interlocking mechanism for moving a lens of its finder and the flash bulb of its strobe in synchronization with the extending and collapsing of the lens barrel.

The above-mentioned camera, however, has drawbacks in that a large space is needed for installing the finder, strobe, or interlocking mechanism, whereby the size of the camera may not efficiently be reduced. Namely, in this camera, it is unnecessary to adjust the visual field angle of the finder and the irradiation angle of the strobe during the time when the lens barrel moves from its accommodating position within the main body to a photographing position. Nevertheless, when the finder lens and strobe flash bulb are completely interlocked with the extending and collapsing operation of the lens barrel via the interlocking mechanism, the lens and flash bulb would move more than necessary, thus increasing the space for installing the finder and strobe, whereby the size of the camera may not efficiently be reduced.

On the other hand, there is a case where a cam is used in the interlocking mechanism in order to restrain the finder lens and strobe flash tube from moving in the above-mentioned manner. For example, Japanese Patent Publication No. 4-78974 discloses an interlocking mechanism comprising a cam plate which moves to-and-fro in synchronization with extending and collapsing of a lens barrel, in which a cam groove is formed in the cam plate obliquely with respect to its moving directions, while the lens of the finder lens and the light-emitting bulb (flash bulb) of the strobe engage with the cam groove. In such an interlocking mechanism, the cam plate moves in synchronization with extending and collapsing of the lens barrel, and the finder lens and the strobe flash bulb move as the cam plate moves. As a part of the cam groove is formed in parallel with the moving directions of the cam plate, the finder lens and the strobe flash bulb can be restrained from moving more than necessary. In such an interlocking mechanism, however, the cam groove has to be made longer than usual, thus increasing the size of the cam plate. Consequently, the interlocking mechanism has a larger size, thereby becoming an obstacle to reducing the size of the camera.

SUMMARY OF THE INVENTION

In order to overcome the problems mentioned above, it is an object of the present invention to provide a camera interlocking mechanism by which the camera can be reduced in size.

The present invention provides an interlocking mechanism for a camera in which a lens barrel is extended from a main body of the camera to a photographing position when in use, the lens barrel being adapted to be collapsed and accommodated within the main body when not in use and further extended from the photographing position upon telephoto photographing, the interlocking mechanism adjusting a visual field angle of a finder and/or an irradiation angle of a strobe in synchronization with the further extending of the lens barrel, the interlocking mechanism comprising:

a driving gear rotating in synchronization with extending and collapsing of the lens barrel and including a plurality of first teeth and a second tooth having a smaller facewidth than the first teeth; and a driven gear, in mesh with the driving gear, for transmitting a driving force of the driving gear to a driving section of the finder and/or a driving section of the strobe and having a plurality of third teeth and a second a fourth tooth having a smaller facewidth than the third teeth and incapable of meshing with the second tooth.

In accordance with the present invention, when the lens barrel is extended and collapsed between the inside of the main body and the photographing position, as the second tooth and the driven gear overlap each other at the position where the driving gear and the driven gear are in mesh with each other, the driving force of the driving gear is temporarily kept from being transmitted to the driven gear, thus allowing the driving gear to idle. Consequently, the finder lens and the strobe flash bulb do not move more than necessary.

The driven gear may have a toothless section at a position adjacent to the fourth tooth. In this case, the driving gear can idle even when a first tooth with a normal facewidth in the driving gear is located at the meshing position. Consequently, a larger amount of idling can be attained in the driving gear by use of a small number of the second teeth.

The interlocking mechanisms may further comprise movement restricting means for restraining, when at least the second tooth overlaps with the fourth tooth or the toothless section, the driven gear or a member interlocked with the driven gear from moving. In this case, the driven gear is restrained from freely moving when the driving force from the driving gear is not transmitted thereto, thus preventing the visual field angle and the irradiation angle of the strobe from shifting after adjustment.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is an exploded view of the camera interlocking mechanism in accordance with Embodiment 1 of the present invention;

FIG. 5 is a sectional view taken along line V—V in FIG. 2;

DESCRIPTION OF THE PREFERRED EMBODIMENTS

In the following, with reference to the accompanying drawings, various embodiments of the present invention will be explained. Among the drawings, constituents identical to each other will be referred to with letters or numerals identical to each other without their overlapping explanations being repeated.

Embodiment 1

Figure 1:
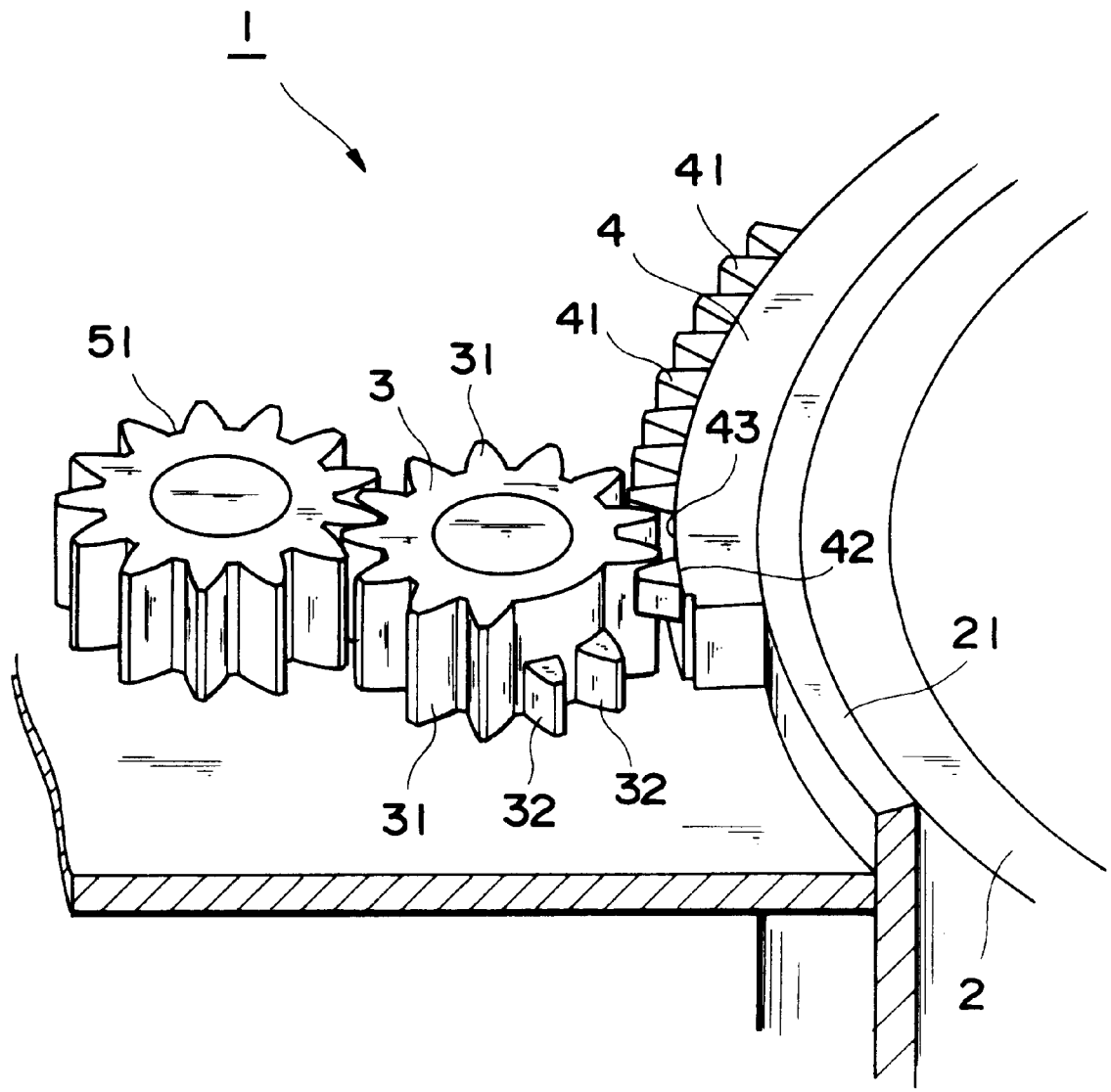
FIG. 1 is an explanatory view of a camera interlocking mechanism in accordance with Embodiment 1 of the present invention.

FIG. 1 is an explanatory perspective view showing a camera interlocking mechanism in accordance with Embodiment 1 of the present invention. As depicted, an interlocking mechanism 1, which is disposed within a camera, is used for appropriately interlocking extending and collapsing operations of a lens barrel 2 with operations for moving a finder lens and a strobe flash bulb. The interlocking mechanism 1 comprises a driving gear 3 and a driven gear 4. The driving gear 3 has a plurality of first or normal teeth 31. Employed as the driving gear 3 is, for example, a spur gear having a plurality of first teeth 31 formed around its outer periphery as shown in FIG. 1. At least one of the first teeth 31 of the driving gear 3 is replaced by second or thin teeth 32 each having a smaller facewidth than the first teeth 31. Each thin tooth 32 has a facewidth which is about a half of the facewidth of the normal teeth 31. For example, two of the first teeth 31 are replaced by the second teeth 32.

The driving gear 3 is rotatably attached to the inside of the camera by means of a shaft, and is adapted to rotate in synchronization with the extending and collapsing of the lens barrel 2. For example, a driving force is imparted to the driving gear 3 through a power-transmitting means 51, such as a gear train, from the same driving source such as a motor that is used for a mechanism for extending and collapsing the lens barrel 2. The driving gear 3 rotates clockwise and counterclockwise respectively as the lens barrel 2 is extended and collapsed, thus being interlocked with the lens barrel 2.

On the other hand, the driven gear 4, which is disposed in mesh with the driving gear 3 as shown in FIG. 1, is a gear for receiving the driving force of the driving gear 3 and transmitting this driving force to driving sections of the finder and strobe. Employed as the driven gear 4, for example, is an arc gear having a number of third or normal teeth 41 formed around its outer periphery as shown in FIG. 1. At least one of the third teeth 41 is replaced by a fourth or a thin tooth 42 having a smaller facewidth than the third teeth 41 so as to be out of mesh with the thin teeth 32 of the driving gear 3. Namely, the thin tooth 42 has a facewidth smaller than that of the normal teeth 41, and is formed at a position different from that of the thin teeth 32 of the driving gear 3 in the facewidth direction, thus being incapable of meshing with the thin teeth 32 but capable of meshing with the normal teeth 31 of the driving gear 3. Also, the driven gear 4 is disposed such that, concurrently with the thin teeth 32 moving to a meshing position (where the normal teeth 31 and 41 mesh with each other) as the driving gear 3 rotates, the thin tooth 42 moves to a meshing position. For example, the thin tooth 42 of the driven gear 4 is disposed at an extreme end position of the driven gear 4 as shown in FIG. 1.

Also, as shown in FIG. 1, the driven gear 4 is disposed so as to be slidable around the outer periphery of an outer wall 21 of an accommodating chamber for accommodating the lens barrel 2. For example, the driven gear 4 is shaped like an arc having a curvature identical to that of the outer periphery of the outer wall 21, and is adapted to move around the outer wall 21 as it receives a driving force from the driving gear 3. Further, no normal teeth 41 are formed at a position of the driven gear 4 adjacent to the thin tooth 42, thus leaving a toothless section 43. The toothless section 43 is in mesh with neither the normal teeth 31 nor thin teeth 32 of the driving gear 3, thereby preventing the driving force from being transmitted to the driven gear 4 even when the driving gear 3 is rotating. For example, as shown in FIG. 1, a region corresponding to one normal tooth 41 is made.

Figure 2:
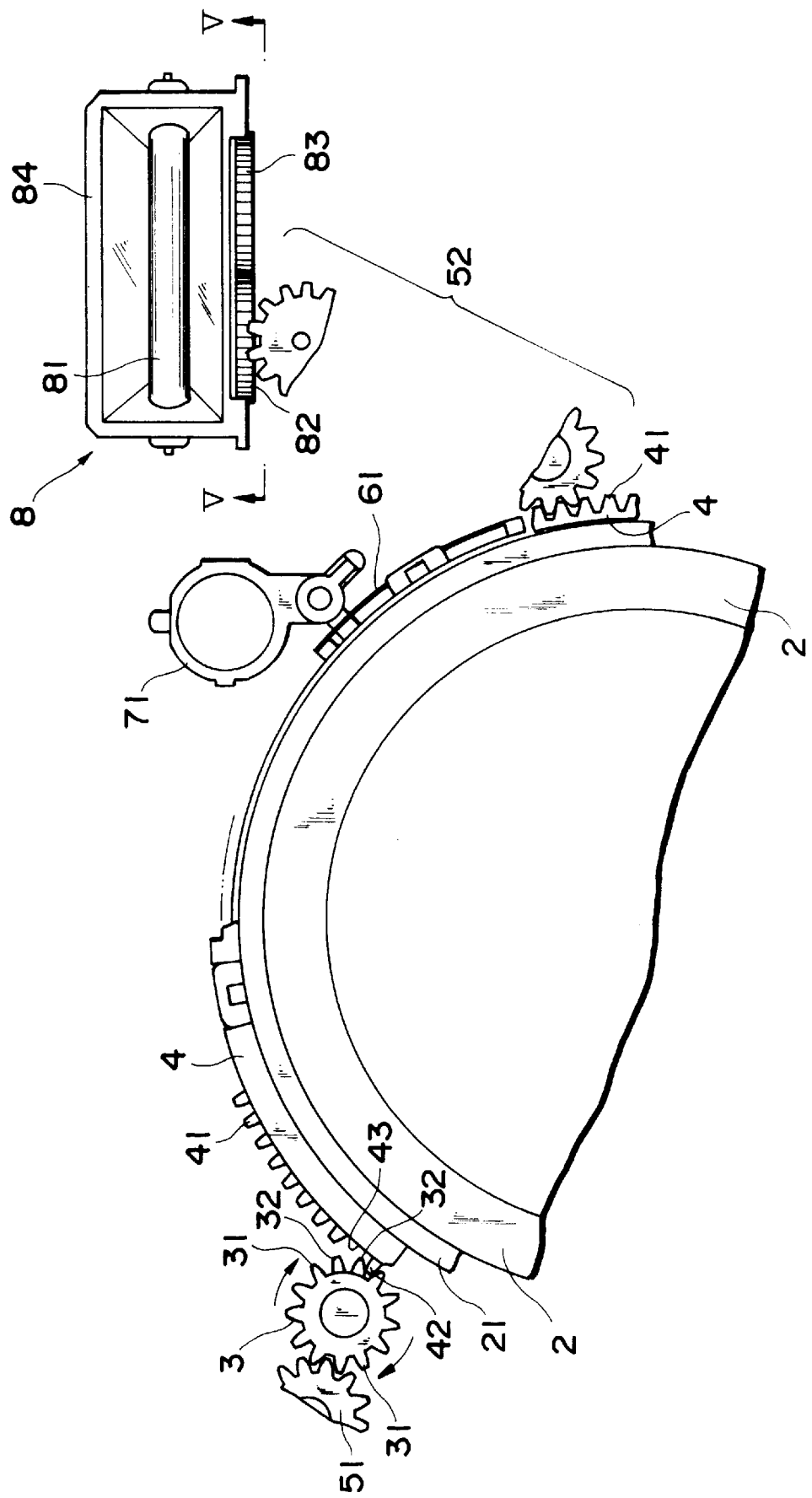
FIG. 2 is an overall explanatory view of the camera interlocking mechanism in accordance with Embodiment 1 of the present invention.
Figure 3:
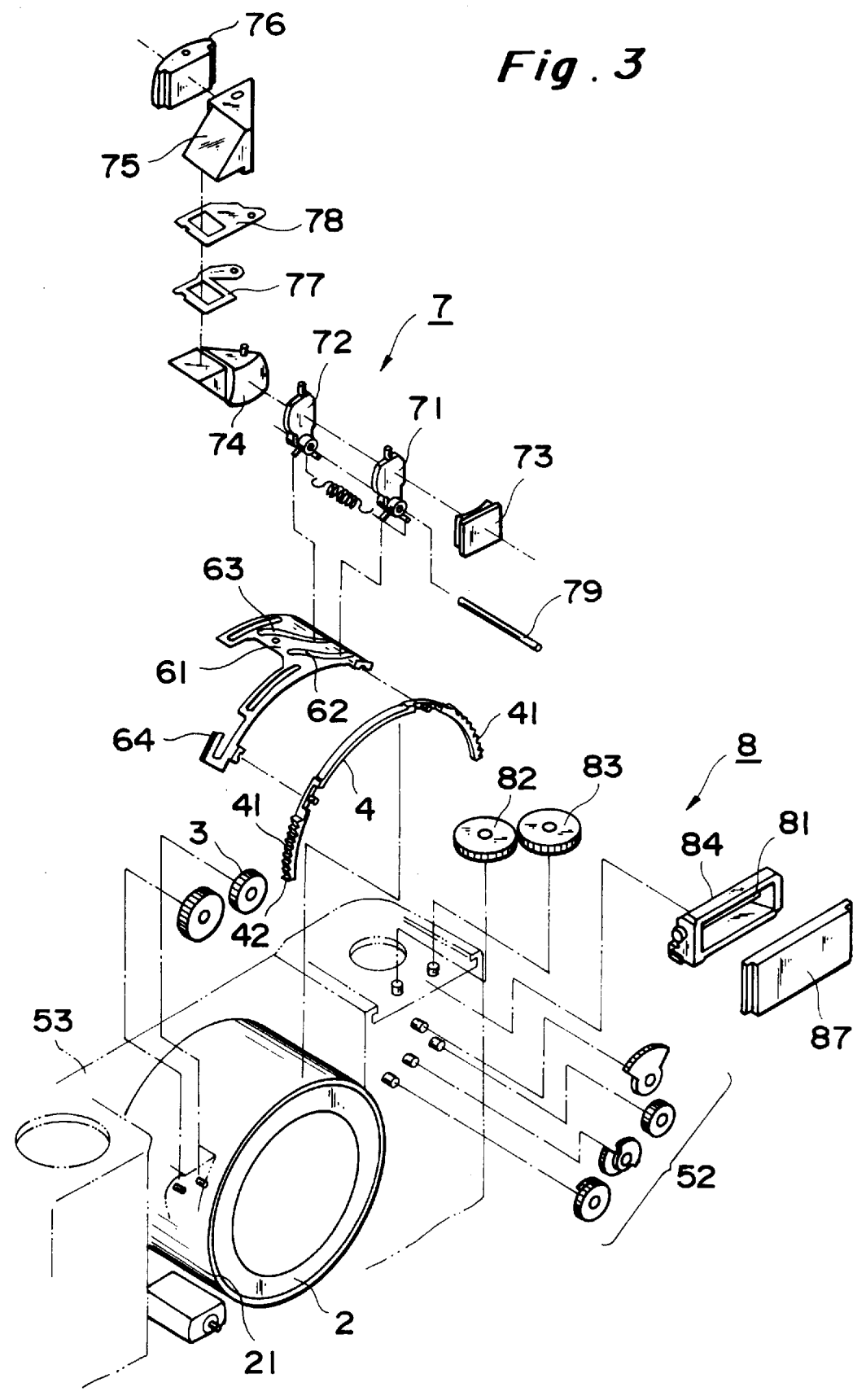

FIG. 2 is an overall schematic view of the camera interlocking mechanism 1 in accordance with Embodiment 1 of the present invention. FIG. 3 is an exploded view showing the same. As shown in FIG. 2, attached to the driven gear 4 is a cam plate 61 formed along its moving directions. The cam plate 61 is used for moving lenses 71 and 72 of a finder 7 and, as shown in FIG. 3, is formed with cam grooves 62 and 63 which are not in parallel with each other. The lenses 71 and 72 are supported by a shaft 79 inserted therein so that they can move only orthogonally to the moving directions of the driven gear 4. The lenses 71 and 72 engage with the cam grooves 62 and 63, respectively. Consequently, as the driven gear 4 and the cam plate 61 move, the lenses 71 and 72 move back and forth according to the opening shapes of the cam grooves 62 and 63. The cam plate 61 may be integrated with the driven gear 4.

As shown in FIG. 3, the finder 7 comprises, for example, not only the lenses 71 and 72, but also an objective lens 73 disposed in front (lower right side in FIG. 3) of the lens 71, a prism 74 disposed behind the lens 72, a prism 75 disposed above the prism 74, an eyepiece 76 disposed behind the prism 75, and a visual field frame 77 and a mask 78 which are placed between the prisms 74 and 75. Here, the lenses 71 and 72, the prisms 74 and 75, and the like are attached to frame members. In such a finder 7, its visual field angle is adjusted when the lenses 71 and 72 move back and forth as the driven gear 4 moves, whereby the photographing area can be appropriately confirmed through an optical system including the lenses 71 and 72 or the like.

Figure 4A:
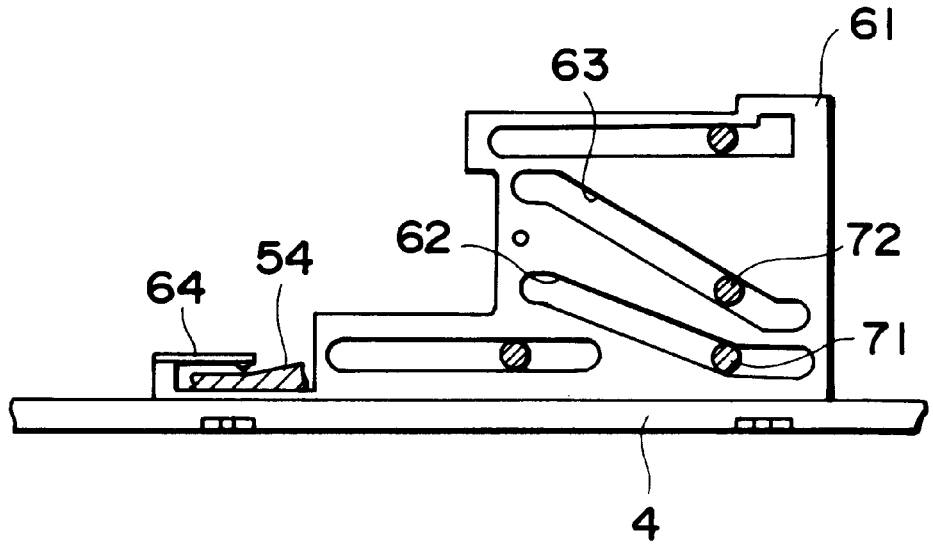
FIGS. 4A and 4B are explanatory views of a movement restricting section.
Figure 4B:
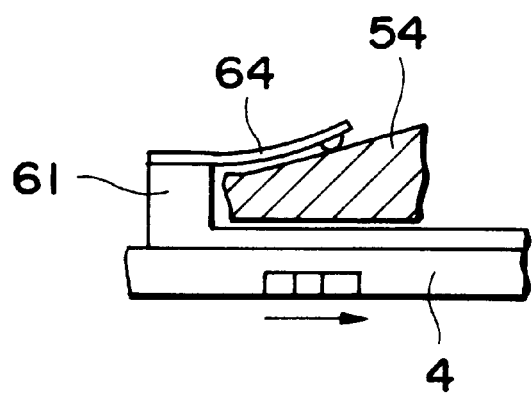

Also, as shown in FIG. 3, the interlocking cam plate 61 is provided with a movement restricting section 64 for restraining the driven gear 4 from moving. The movement restricting section 64 is used for restraining the driven gear 4 from moving when a thin tooth 32 of the driving gear 3 overlaps with the thin tooth 42 or toothless section 43 of the driven gear 4 at the meshing position. Namely, since the driven gear 4 and the driving gear 3 are out of mesh with each other when a thin tooth 32 of the driving gear 3 overlaps with the thin tooth 42 or toothless section 43 of the driven gear 4 at the meshing position, the movement restraining section 64 is provided in order to prevent the driven gear 4 from moving for some reason. For example, as shown in FIG. 4A, the movement restricting section 64 is constituted by a protrusion formed in the cam plate 61 so as to extend along the moving directions of the driven gear 4 and flex orthogonally to the moving directions with elasticity. When a thin tooth 32 of the driving gear 3 overlaps with the thin tooth 42 or toothless section 43 of the driven gear 4 at the meshing position, the movement restricting section 64 is pressed against a friction surface 54, which is formed on the frame members of the finder 7 or an inner frame 53 of the camera main body, thus restraining the driven gear 4 from easily moving.

Here, the movement restricting section 64 may also be formed in the driven gear 4 or any other member interlocked with the driven gear 4. Also, the mechanism for moving the finder lenses is not restricted to one using the cam plate 61. Any other mechanism may be used as long as the finder lenses can be moved in response to the movement of the driven gear 4.

As shown in FIG. 2, the driven gear 4 is also provided with normal teeth 41 on the other end side of the section where the thin teeth 42 are formed. These normal teeth 41 are in mesh with a power-transmitting means 52, such as a gear train, for supplying a moving force to a flash bulb 81 of a strobe 8. Consequently, as the driven gear 4 moves, a driving force is transmitted to the power-transmitting means 52, and this driving force moves the strobe bulb 81 back and forth via the power-transmitting means 52. For example, as shown in FIG. 3, a gear of the power-transmitting means 52 which is to be in mesh with the driven gear 4 is rotatably attached to the inner frame 53 by means of a shaft so as to mesh with the driven gear 4. Also, to the upper face of the inner frame 53, pinions 82 and 83 in mesh with each other are rotatably attached by means of shafts, and one of them is in mesh with the power-transmitting means 52, whereby the pinions 82 and 83 are rotated by the power-transmitting means 52 as the driven gear 4 moves.

Above the pinions 82 and 83, a movable frame 84 accommodating the flash bulb 81 therein is disposed so as to be slidable back and forth. The bottom portion of the movable frame 84 is provided with two racks 85 and 86 respectively in mesh with the pinions 82 and 83. Namely, as shown in FIG. 5, the racks 85 and 86 are disposed in parallel with the irradiating direction of flash, and are respectively in mesh with the pinions 82 and 83 positioned therebetween. As the pinions 82 and 83 rotate, the movable frame 84 and, consequently, the flash bulb 81 are moved back and forth by means of the racks 85 and 86.

As shown in FIGS. 3 and 5, a Fresnel lens 87 is disposed in front of the movable frame 84 so as to be firmly attached to the inner frame 53, thus projecting the flash emitted from the flash bulb 81 toward an object or the like. Consequently, as the flash bulb 81 moves back and forth with respect to the Fresnel lens 87, the irradiation angle of the flash is adjusted.

In the following, operations of the camera interlocking mechanism 1 will be explained.

As shown in FIG. 2, when the lens barrel 2 is accommodated within the main body and the camera is not in use, a thin tooth 32 of the driving gear 3 and the thin tooth 42 of the driven gear 4 are placed at the meshing position (where the normal teeth 31 and 41 mesh with each other). In this state, when a predetermined switching operation or the like is performed for using the camera, a driving source such as motor is actuated, whereby the lens barrel 2 gradually extends from the main body to a photographing position. Concurrently therewith, the driving force of the driving source is transmitted to the driving gear 3 through the power-transmitting means 51, whereby the driving gear 3 begins to rotate clockwise. Nevertheless, as the thin teeth 32 and 42 are located at the meshing position between the driving gear 3 and the driven gear 4, the thin teeth 32 and 42 are out of mesh with each other, whereby the driving gear 3 idles.

Also, since the toothless section 43 is formed adjacent to the thin tooth 42 of the driven gear 4, the normal teeth 31 can be prevented from meshing with the normal teeth 41 of the driven gear 4 before meshing with the thin tooth 42, thus allowing the driving gear 3 to keep its idling state for a longer period of time. This idling state of the driving gear 3 will continue till a normal tooth 31 of the driving gear 3 moves to the meshing position so as to be in mesh with the thin tooth 42 as shown in FIG. 6.

While the driving gear 3 is idling, no driving force is transmitted to the driven gear 4, whereby no driving force is transmitted to the lenses 71 and 72 of the finder 7 and the flash bulb 81 of the strobe 8. On the other hand, the movement restricting section 64 of the cam plate 61 restrains the driven gear 4 from freely moving, thus preventing the driven gear 4 from easily moving upon vibration or the like. Accordingly, while the driving gear 3 is idling, the lenses 71 and 72 of the finder 7 and the flash bulb 81 of the strobe 8 do not move.

Figure 6:
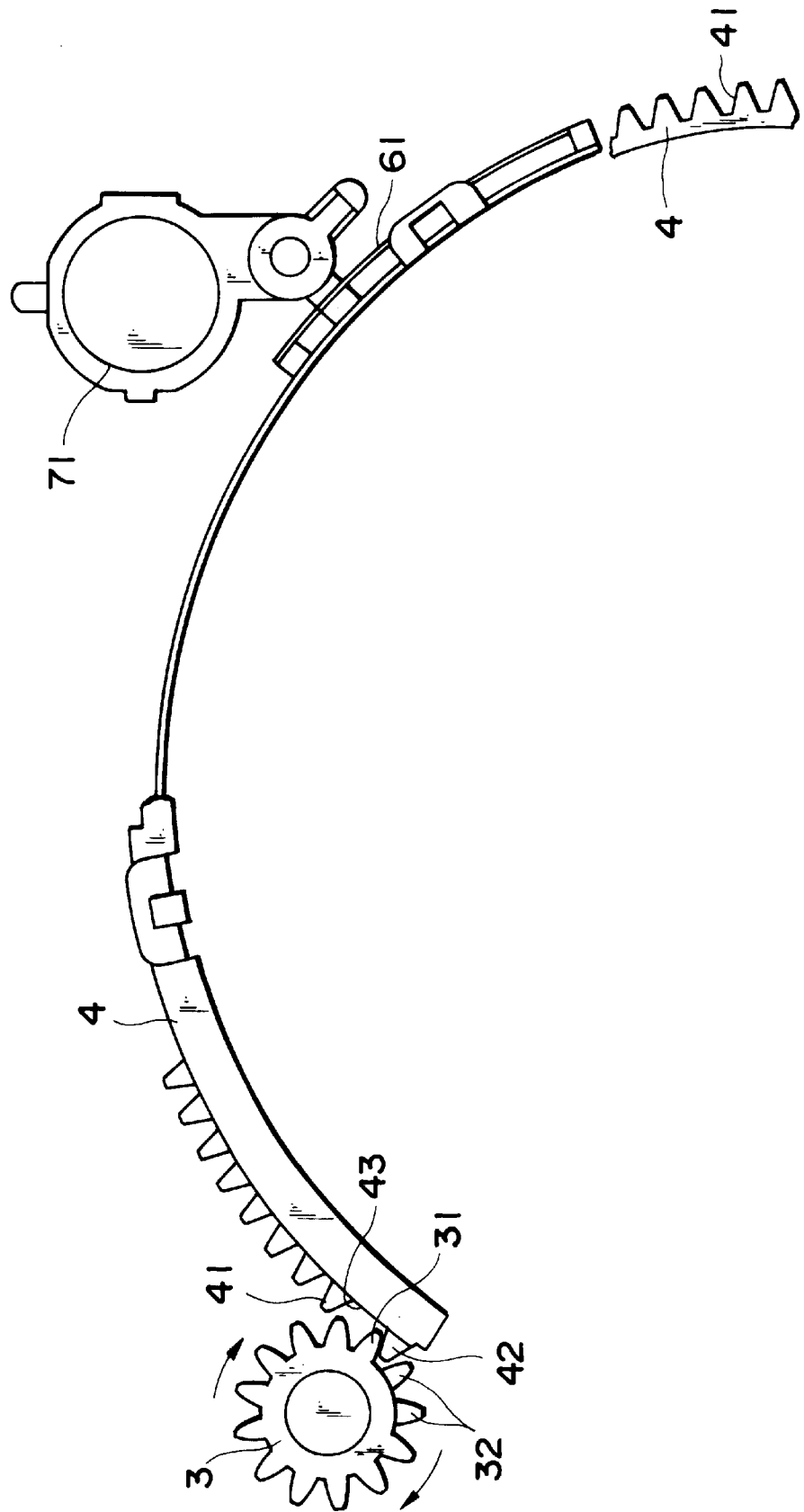
FIG. 6 is an explanatory view of an operation of the camera interlocking mechanism at the time when its driven gear is moved toward the wide-angle side.
Figure 7:
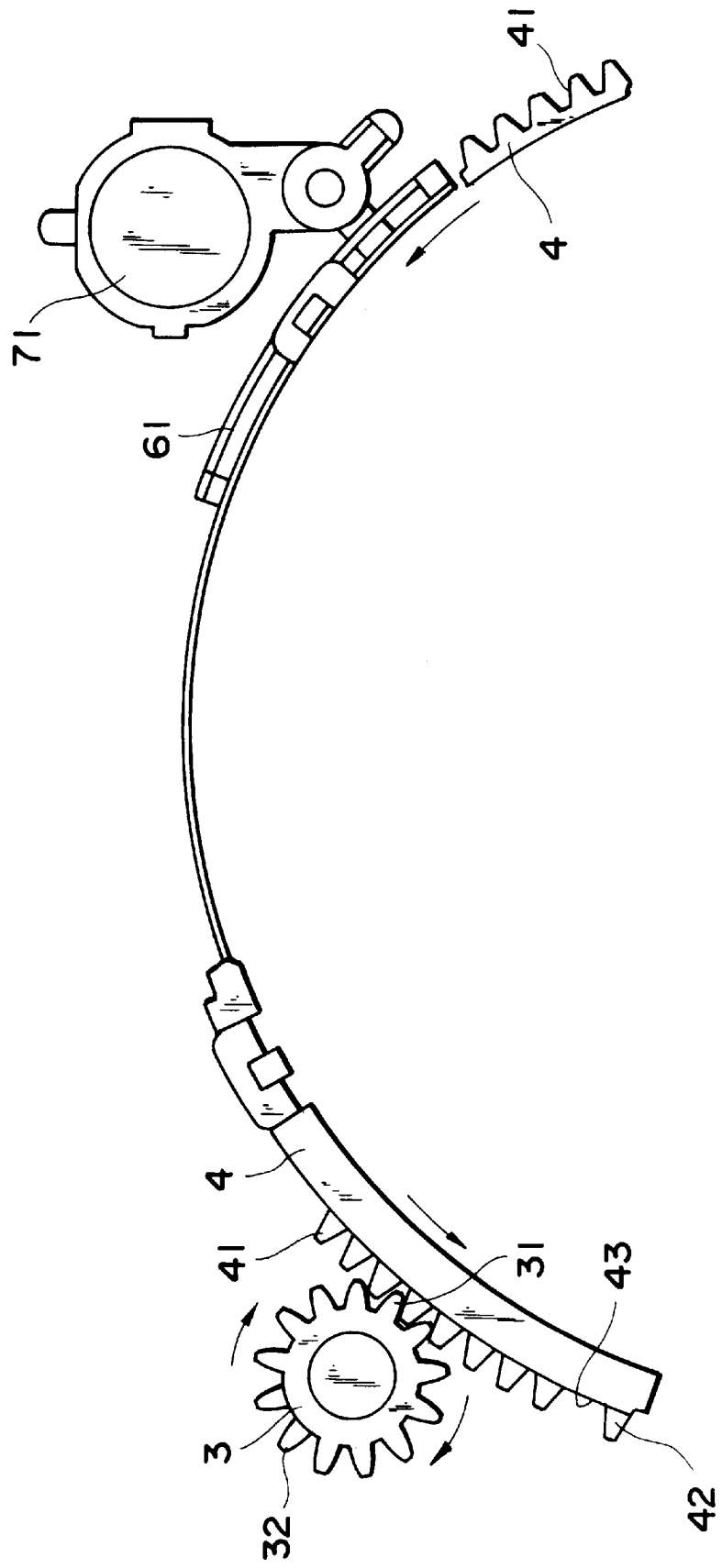
FIG. 7 is an explanatory view of an operation of the camera interlocking mechanism at the time when its driven gear is moved toward the telephoto side.

In the state where the driving gear 3 and the driven gear 4 are in mesh with each other as shown in FIG. 6, the lens barrel 2 has extended to the photographing position, where the object can be photographed. As the lens barrel 2 is further extended from this position, telephoto photographing can be performed as well. Namely, when the lens barrel 2 is further extended, the driving gear 3 rotates in response to the extending operation as shown in FIG. 7, whereby a normal tooth 31 or thin tooth 32 of the driving gear 3 meshes with the tooth 41 of the driven gear 4, thus moving a normal driven gear 4. Then, as the driven gear 4 moves, the cam plate 61 moves. Accordingly, the lenses 71 and 72 of the finder 7 move, whereby the visual field angle of the finder 7 is appropriately adjusted in response to the extending state of the lens barrel 2. Also, as the driven gear 4 moves, the flash bulb 81 of the strobe 8 is moved away from the Fresnel lens 87 by the power-transmitting means 52 and the pinions 82 and 83, whereby the irradiation angle of the strobe 8 is appropriately adjusted. Accordingly, while the photographing area of the object is precisely confirmed through the finder 8, the photographing area of the object is appropriately irradiated with a flash, so as to allow telephoto photographing.

Also, in the state where the lens barrel 2 is extended to allow telephoto photographing, when a predetermined switching operation or the like is effected to collapse the lens barrel 2 into the main body, the driving gear 3 rotates counterclockwise, and the driven gear 4 moves in response to this rotation. Then, as the driven gear 4 moves, the cam plate 61 moves. Consequently, the lenses 71 and 72 of the finder 7 move, whereby the irradiation angle of the finder 7 is appropriately adjusted in response to the extending state of the lens barrel 2. Also, as the driven gear 4 moves, the flash bulb 81 of the strobe 8 is moved toward the Fresnel lens 87 by the power-transmitting means 52 and the pinions 82 and 83, whereby the irradiation angle of the strobe 8 is appropriately adjusted. Accordingly, while the photographing area of the object is precisely confirmed through the finder 8, the photographing area of the object is appropriately irradiated with a flash, thus allowing the object positioned nearby to be photographed. When the lens barrel 2 is collapsed to the photographing position, a thin tooth 32 of the driving gear 3 and the toothless section 43 or thin tooth 42 of the driven gear 4 are brought to the meshing position as shown in FIG. 6, whereby the driving gear 3 idles even when it rotates. Accordingly, until the lens barrel 2 is collapsed into the camera main body, no driving force is transmitted to the driven gear 4, thus preventing the lenses 71 and 72 of the finder 7 and the flash bulb 81 of the strobe 8 from moving more than necessary.

Thus, in accordance with the camera interlocking mechanism 1, when the lens barrel 2 is extended or collapsed between its collapsed position within the main body and the photographing position, neither the lenses 71 and 72 of the finder 7 nor the flash bulb 81 of the strobe 8 can move. Consequently, the lenses 71 and 72 and the flash bulb 81 do not move more than necessary, whereby the space for installing the finder 7 and strobe 8 can be minimized, thus allowing the camera to have a smaller size.

Embodiment 2

Figure 8:
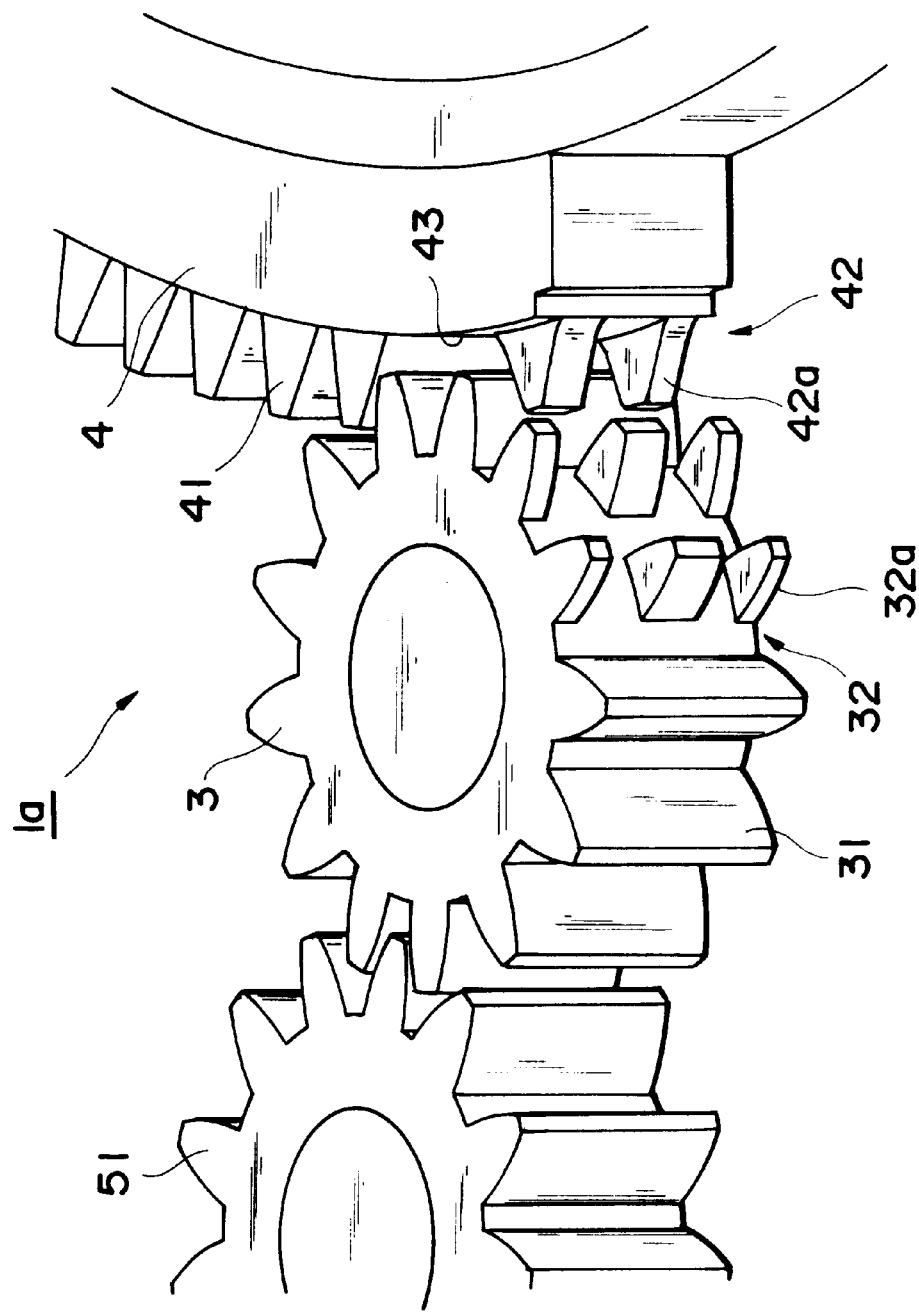
FIG. 8 is an explanatory view of a camera interlocking mechanism in accordance with Embodiment 2 of the present invention.

Though each of the thin teeth 32 of the driving gear 3 and the thin tooth 42 of the driven gear 4 are constituted by a single tooth member in the above-mentioned camera interlocking mechanism 1, each of the thin teeth 32 and 42 may also be constituted by a plurality of tooth members spaced apart in the facewidth direction. Namely, in a camera interlocking mechanism 1a of this embodiment, as shown in FIG. 8, each thin tooth 32 of the driving gear 3 is constituted by a plurality of tooth members 32a, and the thin tooth 42 of the driven gear 4 is constituted by a plurality of tooth members 42a. Further, each of the thin teeth 32 and 42 may be formed like a comb with a plurality of tooth members. In such camera interlocking mechanism 1a, effects similar to those of the above-mentioned camera interlocking mechanism 1 can be obtained as well.

Embodiment 3

Figure 9:
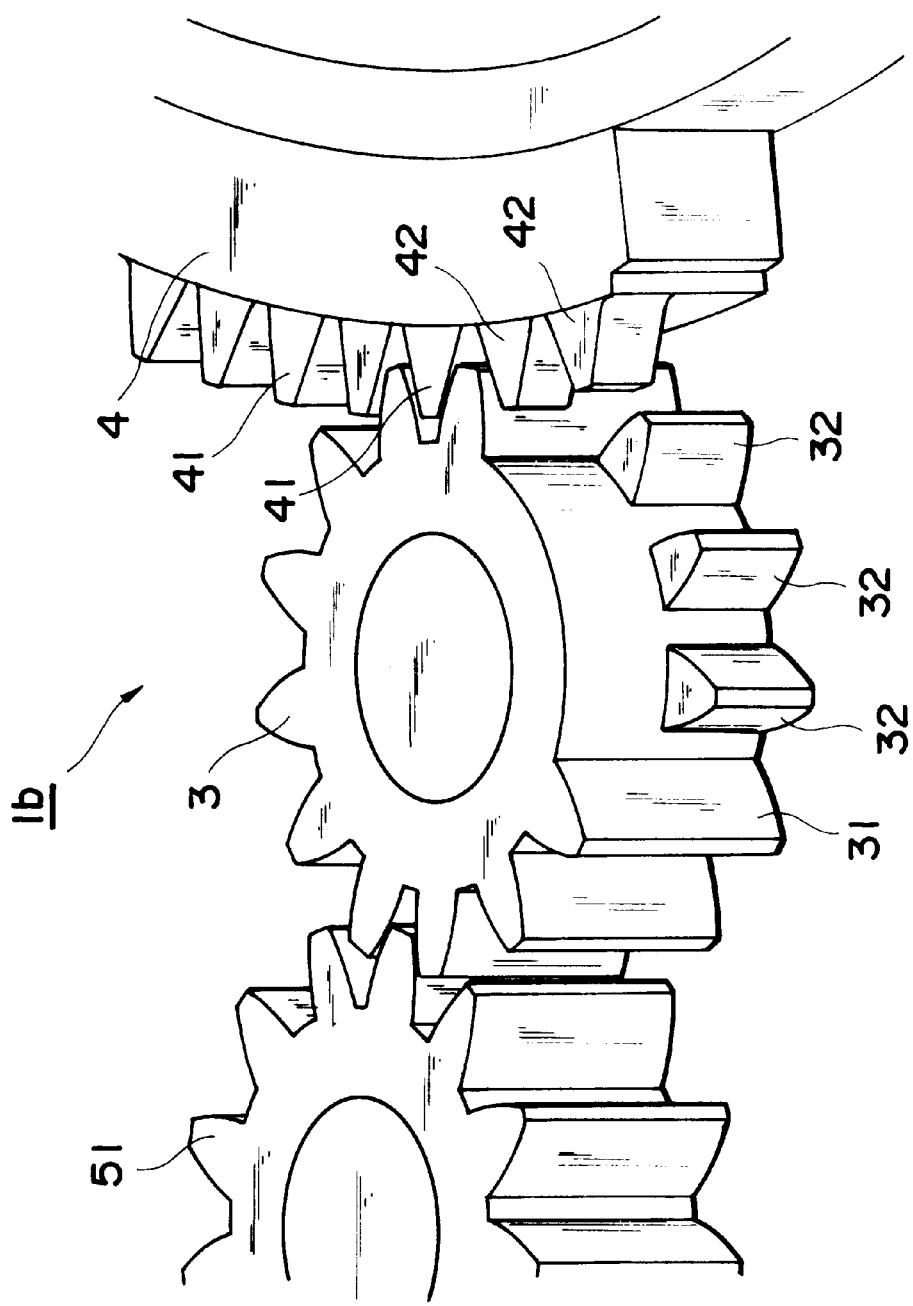
FIG. 9 is an explanatory view of a camera interlocking mechanism in accordance with Embodiment 3 of the present invention.
Figure 10:
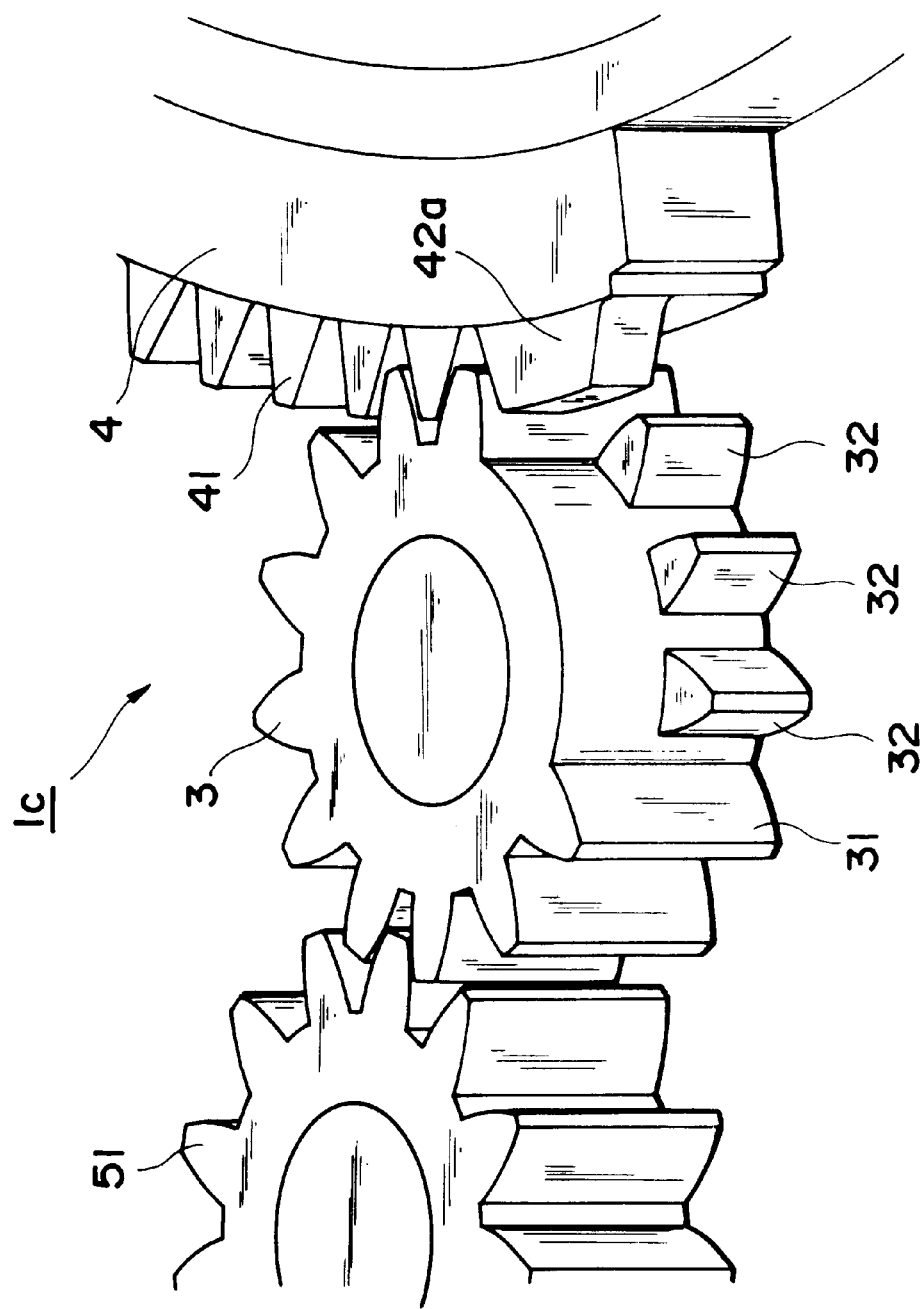
FIG. 10 is an explanatory view of a camera interlocking mechanism in accordance with Embodiment 3 of the present invention.

Though the driven gear 4 has the toothless section 43 adjacent to the thin tooth 42 in the above-mentioned camera interlocking mechanisms 1 and 1a, the driven gear 4 need not have the toothless section 43. Namely, in camera interlocking mechanisms 1b and 1c in accordance with this embodiment, the driven gear 4 has a thin tooth 42 or 42a in addition to the normal teeth 41 without the toothless section 43. For example, as shown in FIG. 9, the camera interlocking mechanism 1b comprises the driven gear 4 in which two thin teeth 42 are formed in succession to the normal teeth 41. In this case, as a 1larger number of the thin teeth 32 are formed in the driving gear 3 (three thin teeth 32 are formed in FIG. 9), the idling state of the driving gear 3 can be kept for a longer period of time compared with the above-mentioned camera interlocking mechanisms 1 and 1a. In such camera interlocking mechanism 1b, effects similar to those of the above-mentioned camera interlocking mechanisms 1 and 1a can be obtained as well. On the other hand, as shown in FIG. 10, the camera interlocking mechanism 1c comprises the driven gear 4 in which the thin tooth 42a is formed in succession to the normal teeth 41. The thin tooth 42a has a facewidth identical to that of the above-mentioned thin tooth 42 and is a tooth member constituted by integrating two adjoining thin teeth 42 with each other. In accordance with such a camera interlocking mechanism 1c, in addition to yielding effects similar to those of the above-mentioned camera interlocking mechanism 1b, the thin tooth 42a, which is inferior to the normal tooth 41 in terms of mechanical strength, can be reinforced, whereby a stable operation can be secured.

Embodiment 4

Though the driven gear 4 is an arc gear in the above-mentioned camera interlocking mechanisms 1 to 1c, it may be constituted by a normal gear as long as it can mesh with the driving gear 3 so as to transmit a driving force to the driving section of the finder or strobe. Also, the driving gear 3 and the driven gear 4 may be constituted by a rack and pinion or the like.

As explained in the foregoing, the following effects can be obtained in accordance with the present invention.

Since each of the driving gear and the driven gear in mesh with each other is provided with a thin tooth, the driving gear can appropriately idle, whereby the finder lenses and strobe flash bulb can be prevented from moving more than necessary. Consequently, the space for installing the finder or strobe can be minimized, thus allowing the camera to have a smaller size.

Also, as the driven gear is provided with a toothless section, the amount of idling of the driving gear can be increased.

Further, as movement restricting means for restraining the driven gear or a member interlocked therewith from moving is provided, when no driving force is transmitted from the driving gear, the driven gear can be restrained from freely moving, thus preventing the visual field angle of the finder and the irradiation angle of the strobe from shifting after adjustment.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An interlocking mechanism for a camera in which a lens barrel is extended from a main body of said camera to a photographing position when in use, said lens barrel being adapted to be collapsed and accommodated within said main body when not in use and further extended from said photographing position upon telephoto photographing, said interlocking mechanism adjusting a visual field angle of a finder and/or an irradiation angle of a strobe in synchronization with said further extending of said lens barrel, said interlocking mechanism comprising:

a driving gear rotating in synchronization with extending and collapsing of said lens barrel and including a plurality of first teeth and a second tooth having a smaller facewidth than said first teeth; and a driven gear adjoining said driving gear for transmitting a driving force of said driving gear to a driving section of said finder and/or a driving section of said strobe and including a plurality of third teeth and a fourth tooth having a smaller facewidth than said third teeth, said first teeth being capable of meshing with said third teeth and said fourth tooth, said third teeth being capable of meshing with said first teeth and said second tooth, said second tooth being capable of meshing with said third teeth but not said fourth tooth, and said fourth teeth being capable of meshing with said first teeth but not said second tooth.

2. The interlocking mechanism according to claim 1, wherein said driven gear has a toothless section between said fourth tooth and one of said first teeth.

3. The interlocking mechanism according to claim 2, further comprising movement restricting means for restricting said driven gear or a member interlocked with said driven gear from movement when said second tooth overlaps said fourth tooth or said toothless section.

4. The interlocking mechanism according to claim 1, further comprising a cam plate for transmitting the driving force of said driving gear to the driving section of said finder.

5. The interlocking mechanism according to claim 4, wherein said cam plate is disposed for movement along a moving direction of said driven gear.

6. The interlocking mechanism according to claim 1, further comprising a power-transmitting means for transmitting the driving force of said driving gear to the driving section of said strobe.

7. The interlocking mechanism according to claim 1, wherein said driven gear is an arc-shaped gear having said third and fourth teeth formed around an outer periphery thereof.

8. The interlocking mechanism according to claim 6, wherein said arc-shaped driven gear is disposed so as to be slidable around an outer periphery of an accommodating chamber for accommodating said lens barrel.

9. The interlocking mechanism according to claim 1, wherein said second tooth comprises a plurality of tooth members spaced from each other in a facewidth direction of said driving gear.

10. The interlocking mechanism according to claim 1, wherein said fourth tooth comprises a plurality of tooth members spaced from each other in a facewidth direction of said driven gear.

11. The interlocking mechanism according to claim 1, wherein said fourth tooth is spaced from an adjoining one of said third teeth in a circumferential direction of said driven gear by a circumferential spacing between two adjoining ones of said third teeth.

12. The interlocking mechanism according to claim 1, wherein said fourth tooth spans a distance in a circumferential direction of said driven gear corresponding to a distance spanned in said circumferential direction by two adjoining ones of said third teeth.

* * * * *